United States Patent
Liu et al.

(10) Patent No.: US 11,752,470 B2
(45) Date of Patent: Sep. 12, 2023

(54) FIXED RIGID WALL DEVICE FOR COMPRESSED PLEAT CONFIGURATION FILTERS

(71) Applicant: EMD Millipore Corporation, Burlington, MA (US)

(72) Inventors: Songhua Liu, Lexington, MA (US); Michael Lynch, Somerville, MA (US); Ryan Sylvia, Tewksbury, MA (US); Joseph Almasian, Westford, MA (US); Salvatore Giglia, Bedford, MA (US); Luc Messier, Beverly, MA (US)

(73) Assignee: EMD Millipore Corporation, Burlington, MA (US)

( * ) Notice: Subject to any disclaimer, the term of this patent is extended or adjusted under 35 U.S.C. 154(b) by 514 days.

(21) Appl. No.: 16/315,069

(22) PCT Filed: Aug. 23, 2017

(86) PCT No.: PCT/US2017/048193
§ 371 (c)(1),
(2) Date: Jan. 3, 2019

(87) PCT Pub. No.: WO2018/044648
PCT Pub. Date: Mar. 8, 2018

(65) Prior Publication Data
US 2019/0224626 A1 Jul. 25, 2019

Related U.S. Application Data

(60) Provisional application No. 62/380,747, filed on Aug. 29, 2016.

(51) Int. Cl.
*B01D 63/14* (2006.01)
*B01D 46/04* (2006.01)
(Continued)

(52) U.S. Cl.
CPC ............. *B01D 63/14* (2013.01); *B01D 46/00* (2013.01); *B01D 46/04* (2013.01); *B01D 46/522* (2013.01);
(Continued)

(58) Field of Classification Search
CPC .................. B01D 63/14; B01D 46/522; B01D 2201/122; B01D 29/016; B01D 29/07;
(Continued)

(56) References Cited

U.S. PATENT DOCUMENTS 3,273,321 A 9/1966 Bauder
3,494,465 A 2/1970 Nyrop
(Continued)

FOREIGN PATENT DOCUMENTS

CN 102612397 A 7/2012
CN 203342490 U 12/2013
(Continued)

OTHER PUBLICATIONS

International Search Report and Written Opinion received for PCT Application No. PCT/US2017/048193, dated Oct. 27, 2017, 6 pages.
(Continued)

*Primary Examiner* — Benjamin M Kurtz
(74) *Attorney, Agent, or Firm* — EMD Millipore Corporation

(57) ABSTRACT

A scaling tool for replicating filtration characteristics of a large-scale filtration device, the scaling tool comprising a housing having a fluid inlet and a fluid outlet, and a filter receiving region in fluid communication with the fluid inlet and the fluid outlet and configured to contain a membrane comprising one or more pleats, the filter receiving region being defined by a rigid wall framework configured to hold the one or more pleats of the membrane and compress the
(Continued)

pleats in an amount effective to replicate the filtration performance of the large-scale filtration device. Also disclosed is a methodology for configuring a filter receiving region in a scaling tool.

3 Claims, 17 Drawing Sheets

(51) Int. Cl.
B01D 46/52 (2006.01)
B01D 46/00 (2022.01)

(52) U.S. Cl.
CPC .... B01D 2201/122 (2013.01); B01D 2313/20 (2013.01)

(58) Field of Classification Search
CPC ... B01D 29/031; B01D 29/038; B01D 29/072
See application file for complete search history.

(56) References Cited

U.S. PATENT DOCUMENTS

| | | | |
|---|---|---|---|
| 3,494,466 A * | 2/1970 | Fritz | B01D 27/005 210/232 |
| 3,698,562 A | 10/1972 | Farrow et al. | |
| 3,722,694 A | 3/1973 | Agranat | |
| 3,799,354 A | 3/1974 | Buckman et al. | |
| RE29,447 E | 10/1977 | Farrow et al. | |
| 4,244,820 A | 1/1981 | Hauk et al. | |
| 4,501,663 A | 2/1985 | Merrill | |
| 4,838,901 A | 6/1989 | Schmidt et al. | |
| 4,839,037 A | 6/1989 | Bertelsen et al. | |
| 4,872,990 A | 10/1989 | Van Wijk | |
| 4,976,857 A | 12/1990 | Solomon | |
| 5,041,220 A | 8/1991 | Lee et al. | |
| 5,112,503 A | 5/1992 | Raifman | |
| 5,178,760 A * | 1/1993 | Solberg, Jr. | B01D 46/0015 493/356 |
| 5,273,560 A * | 12/1993 | Kadoya | B01D 29/012 55/498 |
| 5,302,354 A | 4/1994 | Watvedt et al. | |
| 5,366,625 A | 11/1994 | Pedersen et al. | |
| 5,460,720 A | 10/1995 | Schneider | |
| 5,489,352 A | 2/1996 | Spearman | |
| 5,580,452 A | 12/1996 | Lin | |
| 5,626,752 A | 5/1997 | Mohn et al. | |
| 5,628,909 A | 5/1997 | Bellhouse | |
| 6,096,207 A | 8/2000 | Hoffman, Jr. et al. | |
| 6,143,174 A | 11/2000 | Graus | |
| 6,165,365 A | 12/2000 | Salyer et al. | |
| 7,160,455 B2 | 1/2007 | Taniguchi et al. | |
| 8,110,016 B2 | 2/2012 | McCollam | |
| 2010/0012586 A1 | 1/2010 | Angelescu et al. | |
| 2011/0042294 A1 | 2/2011 | Bonta et al. | |
| 2014/0096493 A1 | 4/2014 | Kelmartin et al. | |
| 2015/0224433 A1 | 8/2015 | Lans | |
| 2015/0343359 A1 | 12/2015 | Neef et al. | |

FOREIGN PATENT DOCUMENTS

| | | |
|---|---|---|
| CN | 104780990 A | 7/2015 |
| CN | 105813707 A | 7/2016 |
| EP | 3 042 707 A1 | 7/2016 |
| JP | H06-182161 A | 7/1994 |
| JP | H11-239574 A | 9/1999 |
| JP | 2000-000439 A | 1/2000 |
| JP | 2000-153122 A | 6/2000 |
| JP | 2000-517240 A | 12/2000 |
| JP | 2001-198425 A | 7/2001 |
| JP | 2002-534243 A | 10/2002 |
| JP | 2011-45876 A | 3/2011 |
| JP | 2013-233495 A | 11/2013 |
| WO | 1989/000880 A | 2/1989 |
| WO | 03/084637 A1 | 10/2003 |
| WO | 2018/044648 A1 | 3/2018 |

OTHER PUBLICATIONS

"Extended European Search Report received for European Patent Application No. 17847234.6, dated Feb. 28, 2010", 7 pages.
Brown, et al., "Membrane pleating effects in 0.2 μm rated microfiltration cartridges", Journal of Membrane Science, vol. 341, Issue 1, Sep. 30, 2009, pp. 76-83.
Brown, et al., "Scale down prediction of industrial scale pleated membrane cartridge performance", Biotechnology and Bioengineering, vol. 108, No. 4, Dec. 22, 2010, pp. 830-838.
Office Action received for Japanese Patent Application No. 2020-216245, dated Aug. 23, 2022, 6 Pages (3 pages of English Translation & 3 Pages of Original Copy).

* cited by examiner

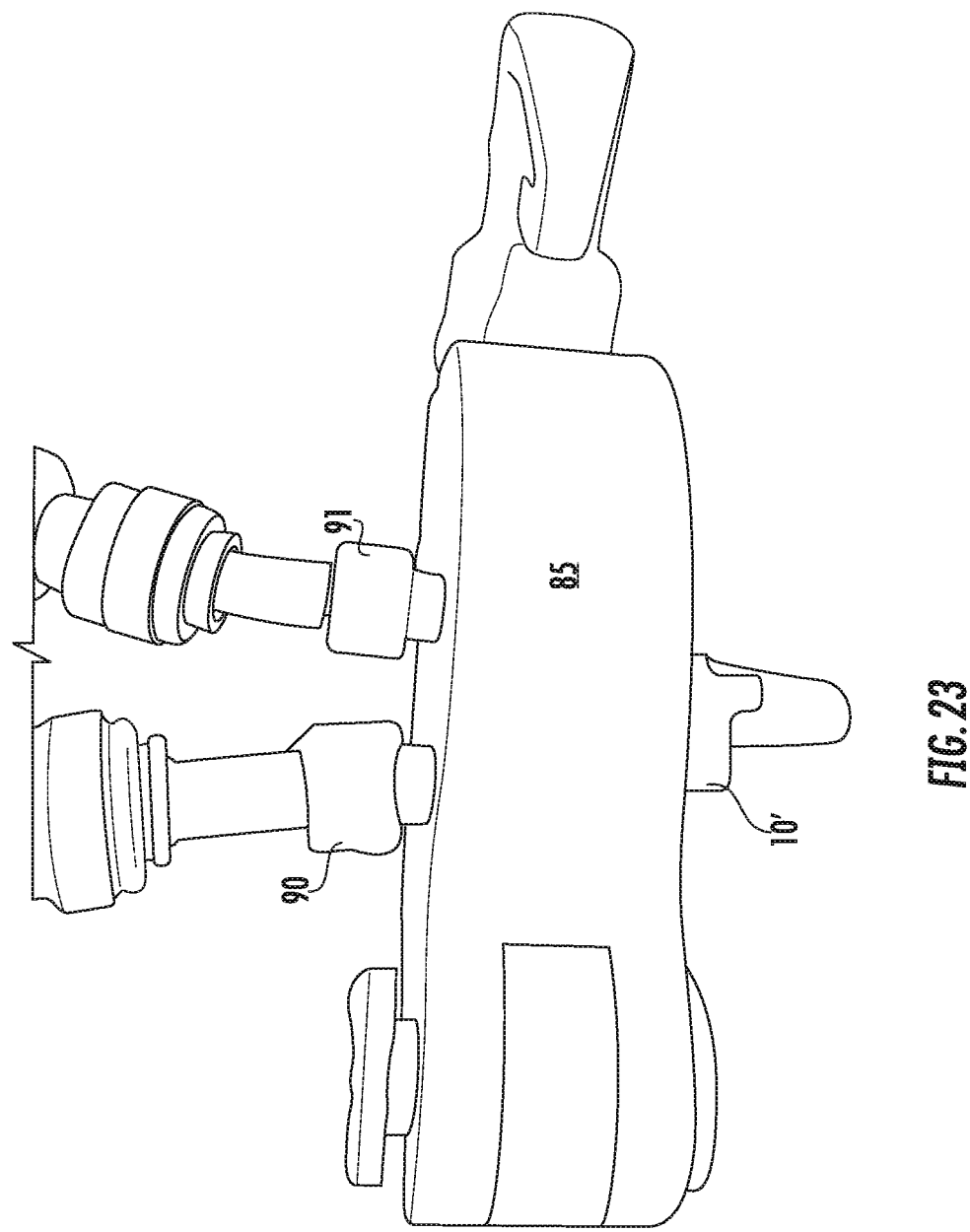

FIXED RIGID WALL DEVICE FOR COMPRESSED PLEAT CONFIGURATION FILTERS

The present application is a US National Stage application of International Application No. PCT/US2017/048193, filed Aug. 23, 2017, which claims the benefit of priority of U.S. Provisional Application Ser. No. 62/380,747, filed Aug. 29, 2016, the entire content of each of which is incorporated herein in by reference in its entirety.

BACKGROUND

Small-scale sizing filters are extremely useful for initial evaluation of large-scale filter performance in process streams, particularly for estimating membrane area requirements for full-scale operation. Linear scale-up assumes that the filtration performances, e.g., flux and capacity, scale linearly with the membrane area regardless of the selected device formats. However, linear scaling is often inaccurate in practice, as a number of factors can affect scaling predictions. As a result, large safety factors typically must be used to allow for variability in membrane performance and process conditions.

Cylindrical filtration cartridges include pleated layers of porous materials. Pleated formats are commonly used for sterilizing-grade membrane filtration applications, for example, and a variety of pleat configurations are possible, with high-density pleat geometries allowing for a high membrane surface area to be contained in a relatively compact device. However, high-density pleat configurations can cause flow restriction issues.

The number of pleats, of a given thickness and angles between pleats, dictates how much compression exists on the pleat. As pleat pack density increases, compression increases; similarly as more pleats are inserted into a cylindrical cartridge or filter housing, the angle between pleats decreases. As the angle between pleats decreases and the compression among the pleats increases, filtration properties are affected. With higher area pleated filtration devices, compression between pleats is increased, changing filtration properties such as flux and filter capacity (which is often measured by throughput values).

That is, the denser the pleat structure is, the more difficult it is for larger particles to migrate between the pleats to access lower regions of the pleated membrane. This can cause scaling inaccuracy when a user is attempting to estimate scaling properties from bench top to production scales. Conventionally, a combination of flat disc of membrane (e.g., EMD Millipore's Optiscale® 25 capsule filtration device) and modeling is used to predict the performance of normal flow filtration large-scale devices. However, the ability of flat sheet membranes alone to predict performance of large-scale devices is limited, particularly when the large-scale device is a high area device with a dense pleat structure. A more accurate scaling tool would be desirable.

It would therefore be desirable to provide a scaling device that exhibits filtration properties that are more indicative of large-scale filtration devices, and allows for accurate scaling to high area pleated devices in all challenging streams.

It also would be desirable to provide a modeling methodology to determine the requirements for a scaling tool that accurately predicts the performance of a large-scale filtration device.

SUMMARY

The problems of the prior art have been overcome by the embodiments disclosed herein, which relate to small-scale filtration scaling tools. In certain embodiments, a rigid wall framework is provided that can be used in a variety of scaling tool formats to control filtration properties. The rigid wall framework defines a filter receiving region. In some embodiments, the filter receiving region is wedge-shaped. In certain embodiments, the scaling tools are single-use and include the rigid wall framework that fixes the pleats of a pleated membrane in an orientation that allows the tool to proportionally replicate filter performance (e.g., throughput) of large-scale cylindrical filtration devices. In certain embodiments, the proportional replication is one-to-one or substantially one-to-one. In certain embodiments, the tool is a single-use tool including an internal rigid wall framework and a pleated membrane supported thereby. In certain embodiments, the rigid wall framework is configured to allow the tool to be predictive of the performance of large-scale filtration devices when a challenging stream is introduced to the device, facilitating scale-up based upon the device performance when so challenged.

In some embodiments, the scaling tool is for replicating filtration characteristics of a large-scale filtration device, and comprises a housing having a fluid inlet and a fluid outlet, and a filter receiving region in fluid communication with the fluid inlet and the fluid outlet and configured to contain a filter such as pleats of a pleated membrane, the filter receiving region being defined by a rigid wall framework configured to hold the filter, e.g., one or more pleats of the membrane and compress the filter in an amount effective to proportionally replicate the filtration performance of the large-scale filtration device. In certain embodiments, the rigid wall framework holds the filter in a predetermined orientation. In some embodiments the predetermined orientation is wedge-shaped.

In some embodiments, the dimensions of the filter receiving region are determined based upon the configuration of a large-scale device. For example, the number of pleats of a pleated membrane in a large-scale device, the height of those pleats, and the compression of the pleated membrane in that device, are known parameters and can be used to determine the configuration of the filter receiving region of the scaling tool necessary to proportionally replicate the performance of the large-scale device, based upon the number of pleats and the height of the pleats of the pleated membrane used in the scaling tool. In some embodiments, once the theoretical configuration of the filter receiving region is determined based on the large scale device, further modification of the filter receiving region of the scaling tool may be made, such as by indirect comparison with the large scale device by using data generated from comparison of a conventional scaling device with the large scale device. Correlating the performance of the scaling tools to the large scale device indirectly by correlating the scaling tool to the performance of conventional scaling tools such as the Optiscale®-25 ("OS-25") device (which has been previously correlated to the large scale device) is desirable since it eliminates the need to use the relatively large feed volumes to run the large scale device. For example, the performance of the scaling tool can be compared to the performance of a conventional scaling tool such as the Optiscale®-25 (OS-25) device using membranes from the same lot. The variance in performance between the instant scaling tool and the OS-25 device is then evaluated. If the performance of the scaling tool is different from the OS-25 device, a scaling factor may applied and the design of the filter receiving region of the scaling tool may be modified accordingly. For example, the scaling tool may be modified by modifying the angle of the filter receiving area to compress the pleats of the membrane either more or less, depending upon how the performance of the scaling tool differed from the OS-25 device. Other dimensions of the filter receiving region of the instant scaling tool can be similarly modified.

The scaling device of the embodiments disclosed herein allow for a scale down from large-scale devices on the order of hundredths to thousandths.

BRIEF DESCRIPTION OF THE DRAWINGS

FIG. 23 is a perspective view of a scaling tool shown secured in a sanitary clamp fitting in accordance with certain embodiment, as illustrated in FIGS. 6 through 8 ("Cup" design).

DETAILED DESCRIPTION

Figure 1:
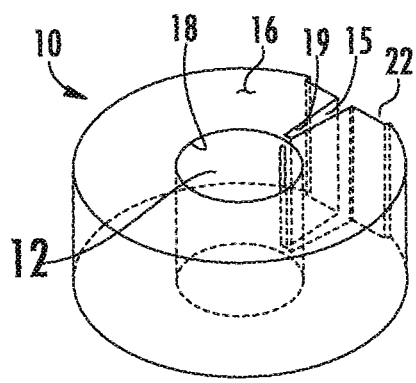
FIG. 1 is a perspective view of a scaling tool member in accordance with certain embodiments ("Puck" design)

A more complete understanding of the components, processes and devices disclosed herein can be obtained by reference to the accompanying drawings. The figures are merely schematic representations based on convenience and the ease of demonstrating the present disclosure, and is, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

In certain embodiments, the large-scale device whose performance it is desired to replicate with a scaling tool is a pleated membrane cartridge. In some embodiments, the large-scale device is a 10-inch high area pleated filtration device, such as those commercially available from EMD Millipore. In some embodiments, the large-scale device is a 10-inch high area pleated cylindrical filtration device wherein the pleated membrane is present in the device in an M-pleat pattern, such as those commercially available from EMD Millipore sold under the tradename MILLIPORE EXPRESS® High Area. In some embodiments, the large-scale device is a 20-inch high area pleated filtration device, such as those commercially available from EMD Millipore. In some embodiments, the large-scale device is a 30-inch high area pleated filtration device, such as those commercially available from EMD Millipore.

Such devices are sterile-grade and high capacity, having about 100% more membrane area than conventional pleated membrane devices. In certain embodiments, the large-scale filtration device is a filtration cartridge having a housing, a fluid inlet, a fluid outlet spaced from the fluid inlet, a core, and a pleated filtration membrane contained and sealed within the housing and located between the inlet and the outlet such that all introduced into the fluid inlet must flow through the membrane prior to exiting the housing through the fluid outlet. The cartridge may be constructed of one or more thermoplastic resins or blends thereof. The membrane may be formed into various configurations such as a pleated or accordion-like configuration or a spiral pleated configuration.

The term "filter" as used herein may include, but is not limited to, one or more porous materials such as membranes, sheets, filters, filter elements, filtration media, and combinations thereof. The filters may be pleated, flat, spirally wound, and combinations thereof. The filters may be a single layered or multilayered membrane device, and may be used for filtration of unwanted materials including contaminants such as infectious organisms and viruses, as well as environmental toxins and pollutants that could be removed by size exclusion and chemical or physical adsorption of the combination thereof. The filter material may be comprised of any suitable material, including, but not limited to polyether sulfone, polyamide, e.g., Nylon, cellulose, polytetrafluoroethylene, poly sulfone, polyester, poly vinylidene fluoride, polypropylene, a fluorocarbon, e.g. poly (tetrafluoroethylene-co-perfluoro(alkyl vinyl ether)), poly carbonate, polyethylene, glass fiber, polycarbonate, ceramic, and metals.

The filtration device could be one-layer of filter material supported by non-woven or woven support material to maintain its structural rigidity Filter material in the device could be two-layer supported by non-woven or woven support material to maintain its structural rigidity. Filter material in the device could be three-layer supported by non-woven or woven support material to maintain its structural rigidity. The support material for filter material in cartridge devices could be woven or non-woven in either top, or bottom, or both top and bottom, and/or in-between filter media.

Filter material can be in porous structures formed by methods known in the art, such as but not limited to, immersion precipitation, thermally induced phase separation, acid/alkaline leaching, electrospinning, eletroblowing, etc. Filter media could be in the form of fibrous mat, or in traditional porous structure such as those found in Millipore Express® and Millipore Durapore® membrane.

Figure 20A:
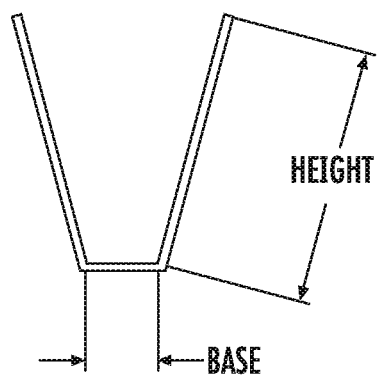
FIG. 20A is a front view of a filter receiving region in accordance with certain embodiments.
Figure 20B:
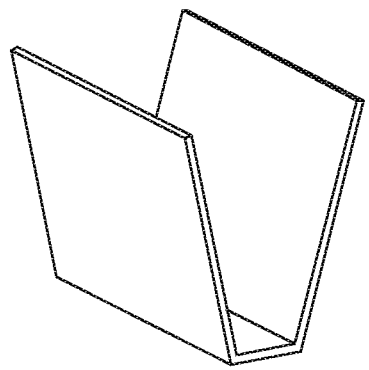
FIG. 20B is a perspective view of a filter receiving region in accordance with certain embodiments.
Figure 20C:
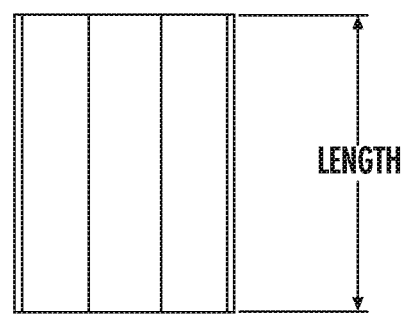
FIG. 20C is a top view of a filter receiving region in accordance with certain embodiments.
Figure 22:
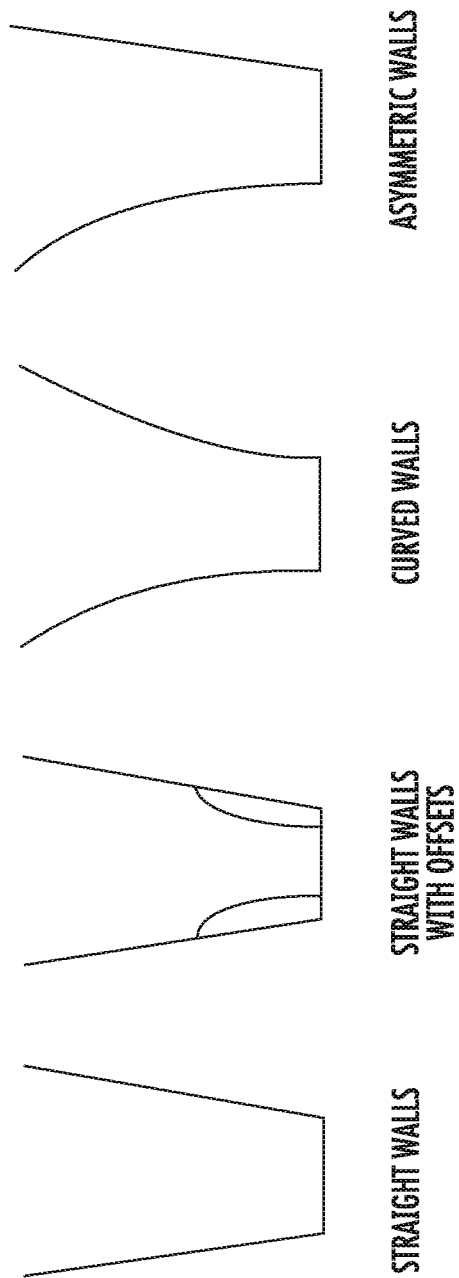
FIG. 22 is a schematic view of various filter receiving region configurations in accordance with certain embodiments.

FIGS. 1-5 illustrate an embodiment enabling incorporation of an appropriate filter receiving region in a scaling tool ("Puck" design) to closely replicate the filtration performance of a large-scale device. The filter receiving region for holding the pleated membrane unit is defined by a base, a height (or wall height), a wall angle, and a length. Each defined part can be calculated from the large scale device that the wedge is designed to mimic. This is depicted in FIG. 20. The base is the downstream side of the filter receiving region (the smaller side). The base dimension is defined and calculated by the dimensions of the large-scale cartridge being mimicked. The base is proportional to the core circumference. The base is equal to cartridge core circumference divided by the count of pleats that contact the core. That value is then multiplied by the pleat count desired in the scaling tool. The height of the filter receiving region is defined by the pleat height of the cartridge that is being mimicked. The height of the filter receiving region can be equal to or greater than the pleat height of the cartridge being mimicked. The side wall angle is proportional to the number of pleats in the scaling tool to that of the whole circular cartridge. With the known distance of the base width and known angle (between adjacent pleat centers) and height of the pleats (FIG. 20A), asymmetrical trapezium is derived. This angle is used to set the slope of the walls of the filter receiving region. It is also crucial that the wall is made from a rigid material in order to supply the compression defined by the designed geometry. In addition to number of pleats, the length of the filter receiving region (FIG. 20C) can be manipulated to achieve a targeted effective filtration area (EFA). All of the above properties can be modified to adjust the desired filtration properties within the scaling tool device. Modification includes, but is not limited to, the wall geometry of the filter receiving region. For example, the wall geometry can be linear, curved, have offset regions that may or may not be symmetrical, etc., as exemplified in FIG. 22.

In FIGS. 1-5, there is shown a donut-shaped member 10 including an internal bore 12 that is configured to be in communication with a fluid outlet (not shown). In some embodiments, the member 10 is defined by an inner annular rigid non-porous wall 18 and an outer annular rigid non-porous wall 16. In certain embodiments, the space between the inner wall 18 and the outer wall 16, except in the location of slot 19, can be solid, or can include spaced radial ribs to provide dimensional stability. The inner and outer annular rigid non-porous walls 18, 16 have discontinuous regions formed by a slot 19 that extends radially outwardly from the bore 12 through the outer wall 16. In certain embodiments, the slot 19 tapers outwardly as it proceeds radially outwardly, such that the width of the slot is the smallest at inner annular wall 18, and is the largest at outer annular wall 16. The slot 19 is thus wedge-shaped, and defines a filter receiving region 15 that is configured to receive the pleats of a pleated membrane 20 (FIG. 1A). It is this filter receiving region 15 feature of the donut-shaped member 10 that is important; the remaining configuration of the donut-shaped member 10 is not critical and is designed mainly to be accommodated in a suitable scaling tool and allow for fluid flow through the pleated membrane positioned in the filter receiving region 15. The filter receiving region 15, having a base width and a known wall angle, provides the smallest unit to mimic the pleat compression seen in large-scale cartridges. Suitable wall angles $\theta$ of the filter receiving region 15 include 8° and 9°, depending upon the pleated membrane compression in the large-scale device being mimicked. Similarly, the wedge radial length can be varied depending upon the pleated membrane height in the large-scale device being mimicked. Thus, the pleated membrane 20 is positioned between the inner and outer walls 16 and 18, and filters fluid flowing from outside the member 10 to the bore 12. The pleated membrane 20 has an active membrane area less than that of a production or large-scale pleated membrane.

Figure 5:
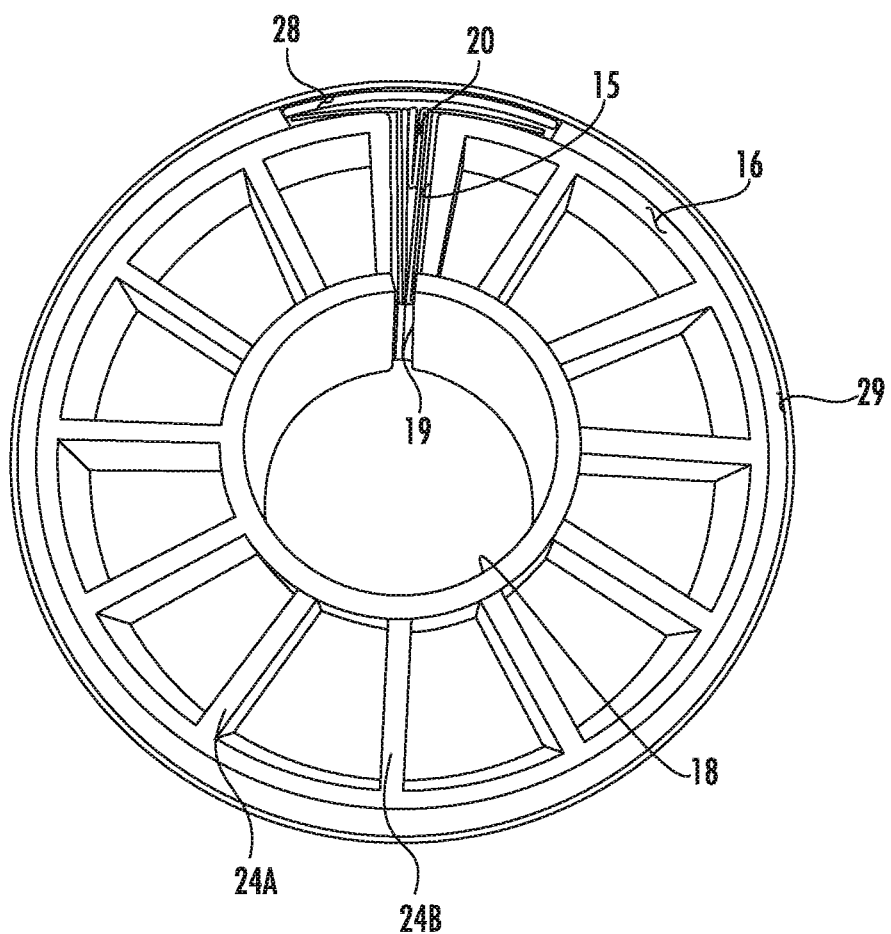
FIG. 5 is a second perspective view of a scaling tool member ("Puck" design) showing a pleated membrane in place, in accordance with certain embodiments.

In certain embodiments, the outside surface of the outer annular wall 16 near the radially outward portion of the slot 19 includes a cut-out 22 as shown. This facilitates insertion of the pleated membrane 20 into the slot 19 and sealing of the ends of the pleated membrane 20 once inserted, as shown in FIG. 1A. Suitable sealing agents are not particularly limited and include epoxies, silicones, acrylics and urethanes. Moreover, thermal bonding can be used to fixate the filter. FIG. 1A illustrates donut-shaped member 10 with a pleated membrane 20 in position and sealed within the filter receiving region 15. In the embodiment shown, a plurality of spaced, radial ribs 24A-24N extend from the inner rigid annular wall 18 to the outer annular wall 16 as shown. In some embodiments, a similar pattern of ribs is provided on the opposite side of the donut-shaped member, separated from the ribs visible in FIG. 1A by a solid floor 26. The ribs act to reinforce the donut-shaped member 10 and provide dimensional stability. FIGS. 1A and 5 also illustrate an annular collar 29 that surrounds the donut-shaped member 10, the annular collar 29 being formed with one or more openings 30, such as slots, to allow fluid to flow into the tool and contact the pleated membrane 20 in the filter receiving region 15.

FIGS. 1A and 5 also illustrate insert 28, which fits within cut-out 22 and the inside wall of the annular collar 29. In certain embodiments, the insert 28 has openings or slots (not shown) to allow for fluid to flow from the slots or openings 30 of collar 29 into the filter receiving region 15. The insert 28 serves to help retain the filter receiving region 15 in the proper position with respect to the collar 29.

In some embodiments, suitable filter materials for the pleated membrane 20 include membrane filters suitable for microfiltration, nanofiltration or ultrafiltration, such as Durapore®, Virosolve® NFP, Virosolve® NFR, and Milligard® cellulosic media commercially available from EMD Millipore. In some embodiments, the pleats of the pleated membrane 20 may be folded in an "M"-shaped pleat pattern.

Figure 1A:
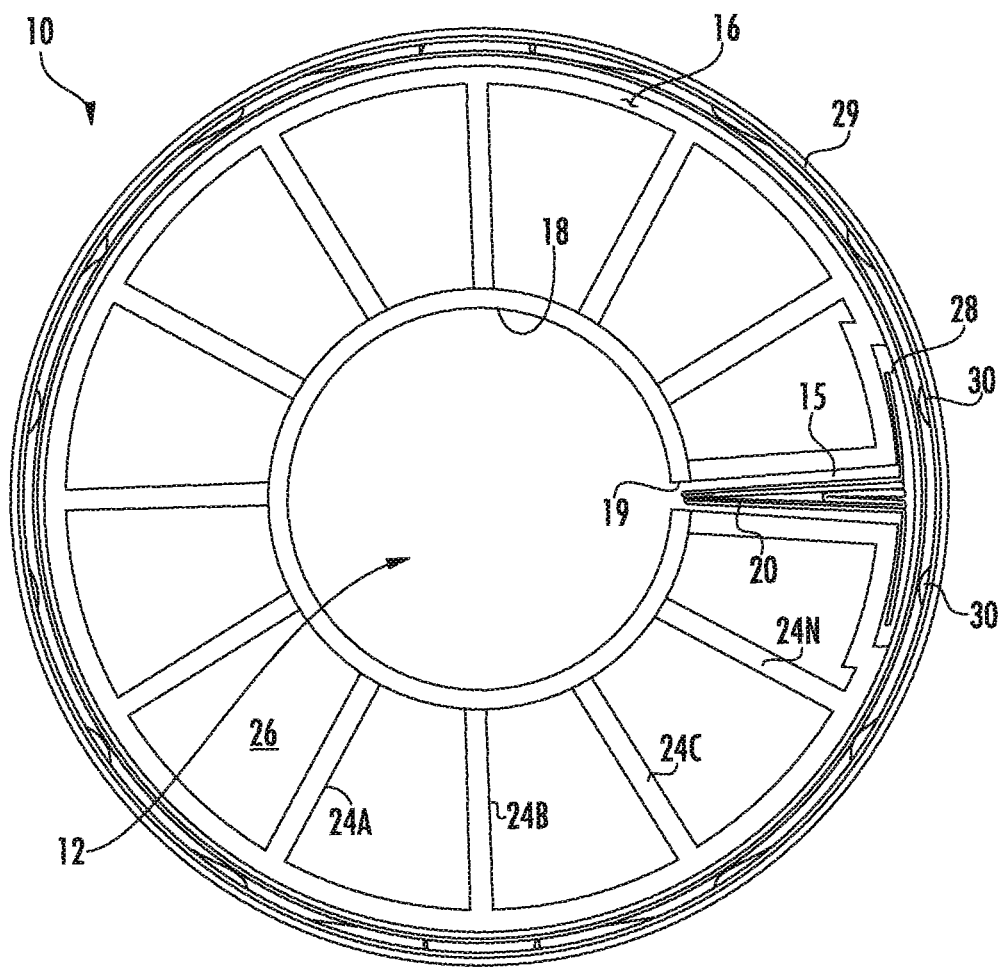
FIG. 1A is a top view of the scaling tool member of FIG. 1 ("Puck" design), with the inclusion of a pleated membrane and a collar, in accordance with certain embodiments.
Figure 1B:
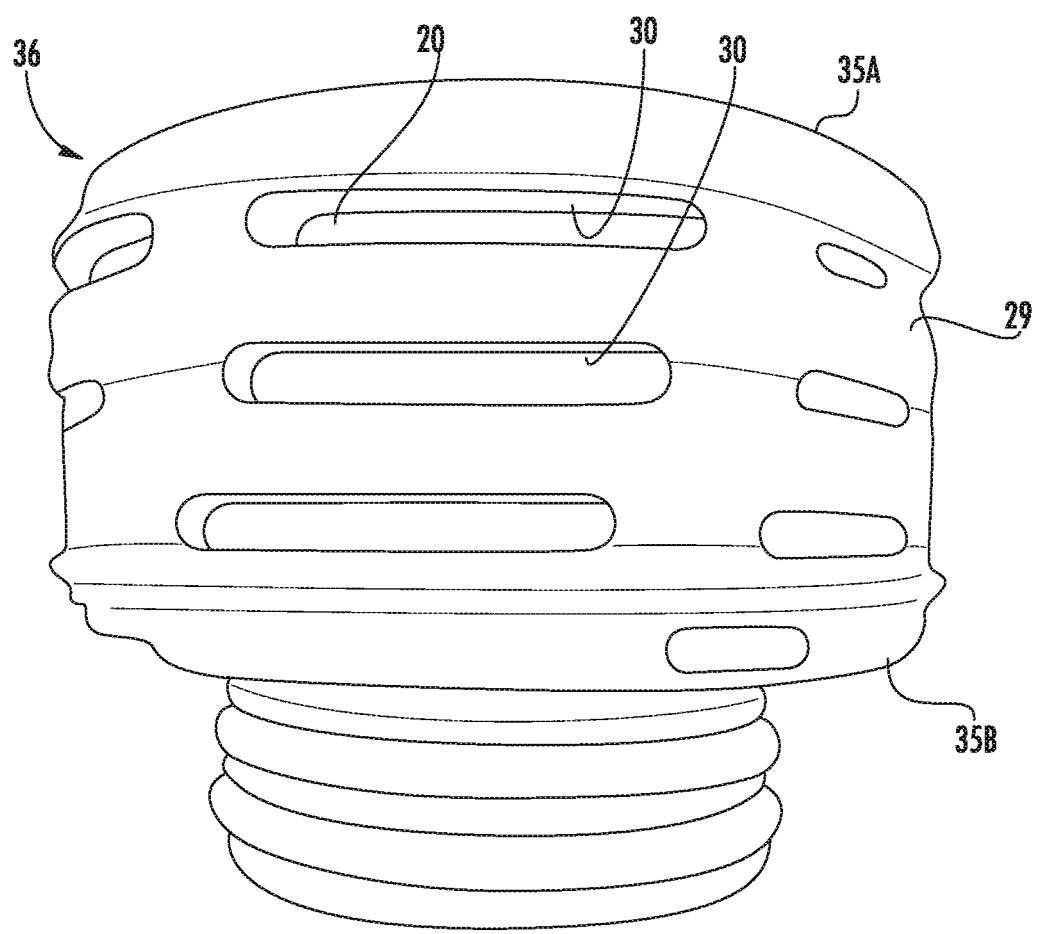
FIG. 1B is a scaling tool housing including the scaling tool member of FIG. 1 ("Puck" design), in accordance with certain embodiments.
Figure 2:
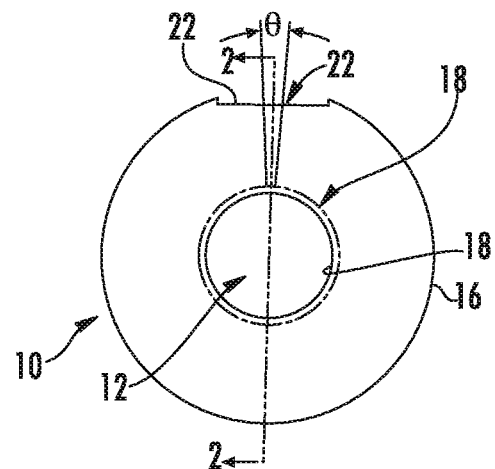
FIG. 2 is a top view of the scaling tool member of FIG. 1 ("Puck" design)
Figure 3:
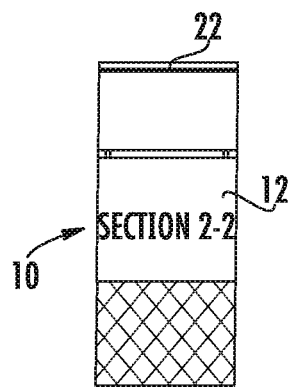
FIG. 3 is a cross-sectional view of the scaling tool member of FIG. 1 ("Puck" design) taken along line 2-2 of FIG. 2.
Figure 4:
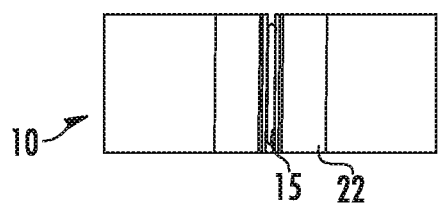
FIG. 4 is a front view of the scaling tool member of FIG. 1 ("Puck" design)

The donut-shaped member 10 is configured to be attached to endcaps 35A, 35B or the like, to form a scaling tool housing 36, such as that illustrated in FIG. 1B. Materials of construction for the scaling tool include those that do not deleteriously interfere with the fluids used during filtration, such as polypropylene, Nylon, polyethylene, polysulfone, polycarbonate and other thermoplastics or thermosetting polymers.

Figure 6:
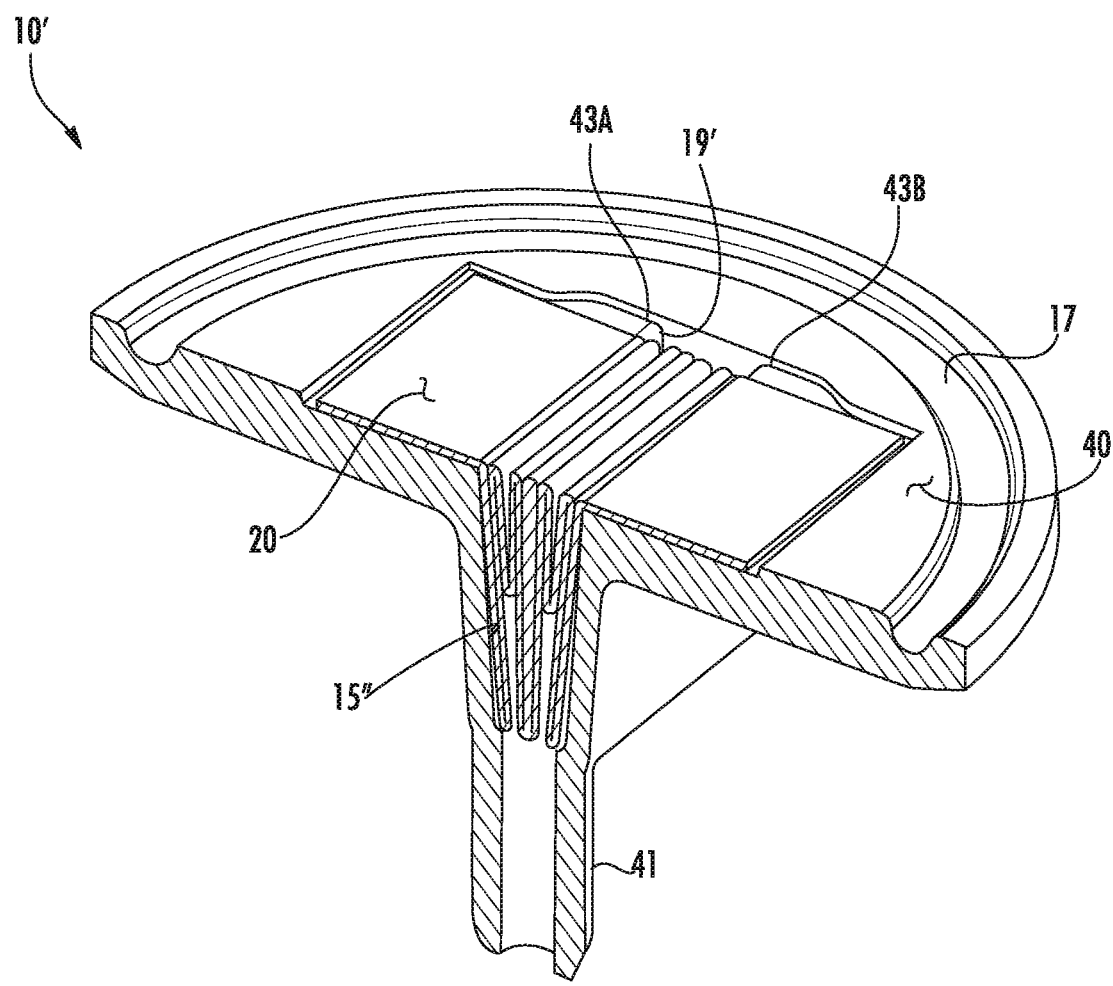
FIG. 6 is a cross-sectional view, in perspective, of a portion of a scaling tool with a pleated membrane in place in accordance with a first alternative embodiment ("Cup" design)
Figure 7:
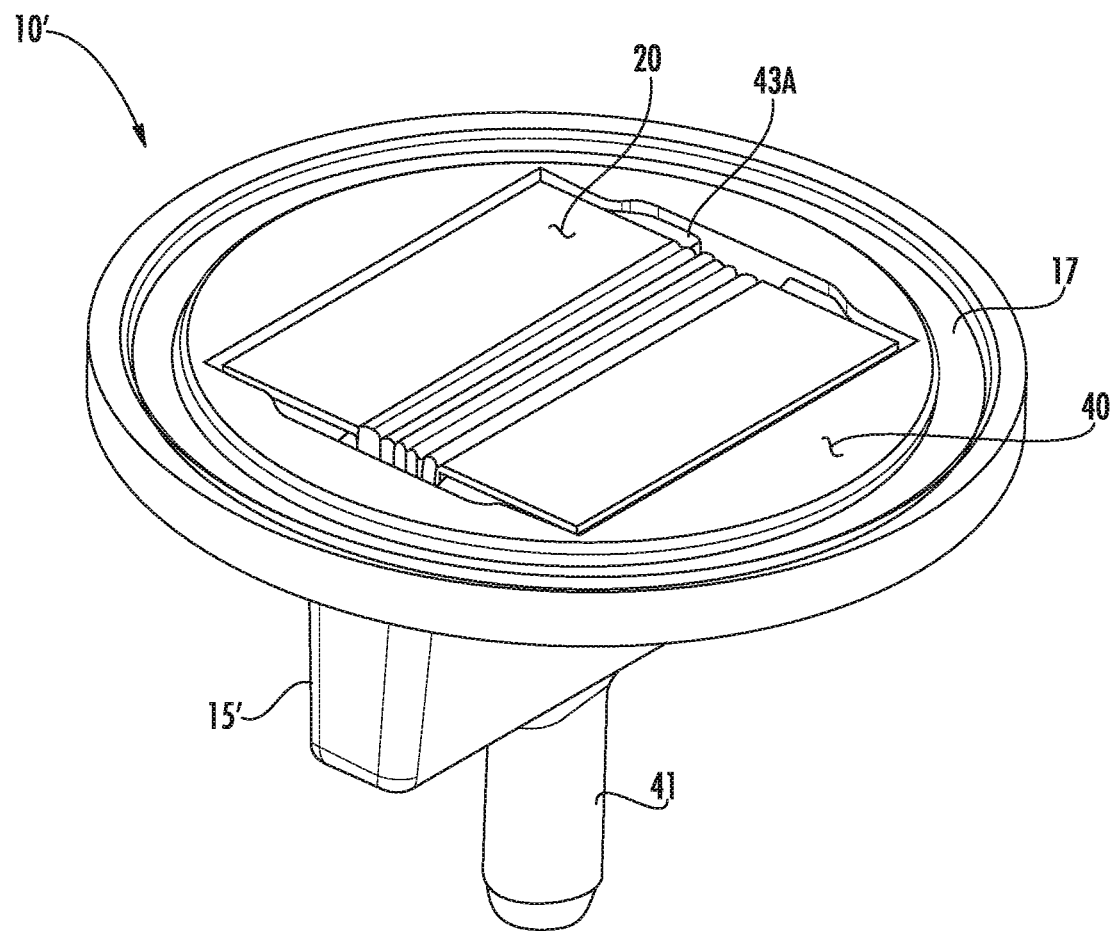
FIG. 7 is a perspective view of the portion of the scaling tool of FIG. 6 ("Cup" design)
Figure 8:
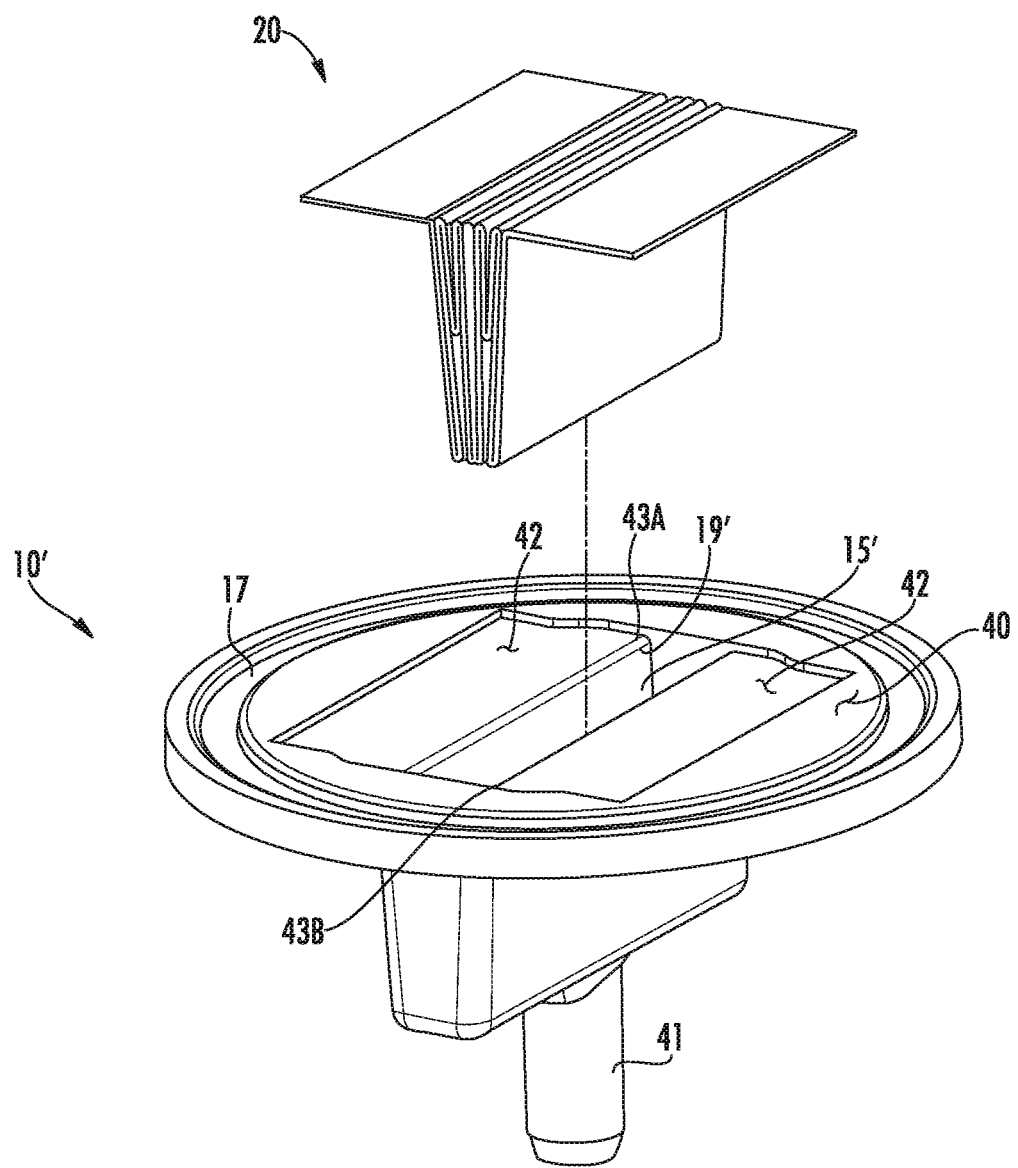
FIG. 8 is an exploded view of the portion of the scaling tool of FIG. 6 ("Cup" design) with a pleated membrane prior to insertion into the tool member and shown without the inlet cover of FIG. 14.
Figure 14:
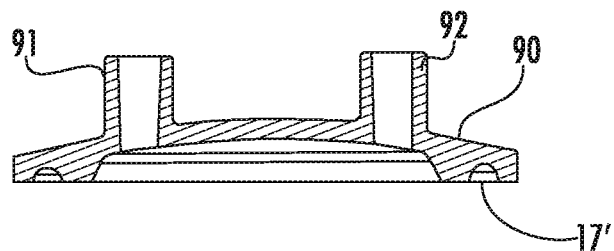
FIG. 14 is a cross-sectional view of an inlet cover for the scaling tool of FIG. 6 ("Cup" design)

FIGS. 6, 7, 8 and 14 illustrate another device ("Cup" design) into which the filter receiving region can be incorporated to provide a scaling tool that closely replicates the filtration performance of a large-scale device. In the embodiment shown, the scaling tool 10' has a disc-shaped surface 40, that includes a slot 19' extending axially and defines a filter receiving region 15' that is in fluid communication with an outlet member 41. An annular groove 17 may be formed in the surface 40 just radially inwardly of the outer circumferential edge to house an O-ring or the like to seal a top housing or cover 90 (FIG. 14) to the surface 40, which also has a corresponding annular groove 17' that aligns with annular groove 17 to accommodate the O-ring. A sanitary clamp fitting 85, such as a Tri-Clamp® fitting (FIG. 23), for example, may be used to secure the assembly (FIGS. 14, 7, and 23). The 1.5 inch Tri-Clamp connection, universally used in the scientific industry, allows for ease of use and multitude of customer connection possibilities attaching the scaling tool to their feed stream, such as shown in FIG. 23. A generic scaling tool cover shown in FIG. 14 has been designed with inlet and vent ports for easy adoption in testing. In certain embodiments, the cover 90 has one or more fluid inlets 91, 92 (one or more may be vents) that are in fluid communication with the filter receiving region 15' when in the assembled condition. In some embodiments, surrounding the opening of slot 19' is a cut-out 42 configured to receive the ends of a pleated membrane. The cut-out 42 can include deeper slits 43A, 43B into which the pleated membrane 20 can be inserted to help secure it in place. The pleats or folds of the pleated membrane are inserted into the filter receiving region 15' as best seen in FIG. 6, and the ends of the pleated membrane 20 can be adhered to the cut-out 42 with a suitable adhesive. The configuration of the slot 19' properly orients and compresses the pleated membrane 20 so that the scaling tool 10' replicates a large-scale filtration device. Materials of construction for the scaling tool include those that do not deleteriously interfere with the fluids used during filtration, such as polypropylene, Nylon, polyethylene, polysulfone, polycarbonate and other thermoplastics or thermosetting polymers.

Figure 9:
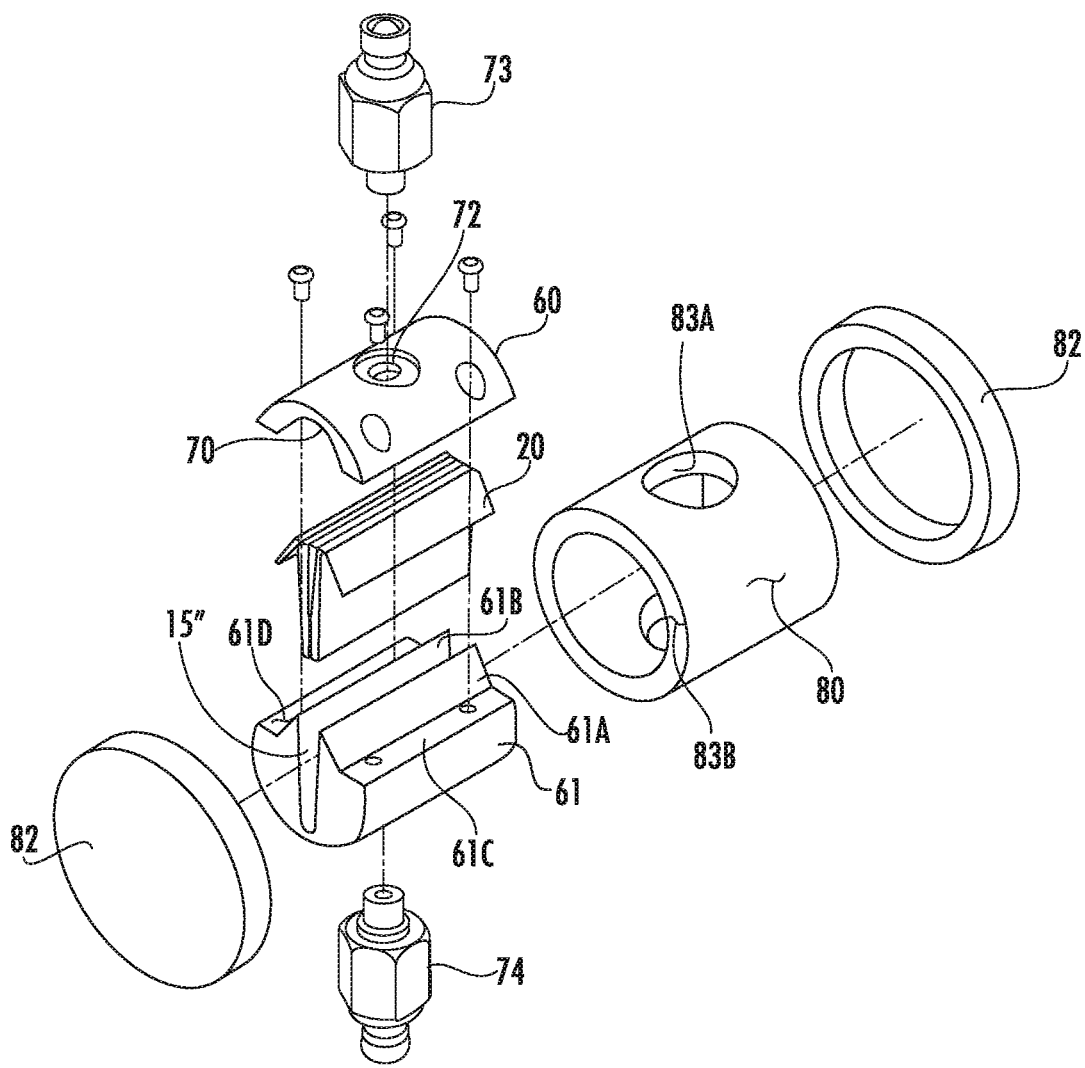
FIG. 9 is an exploded view of a scaling tool in accordance with a second alternative embodiment ("Compact" design)
Figure 10:
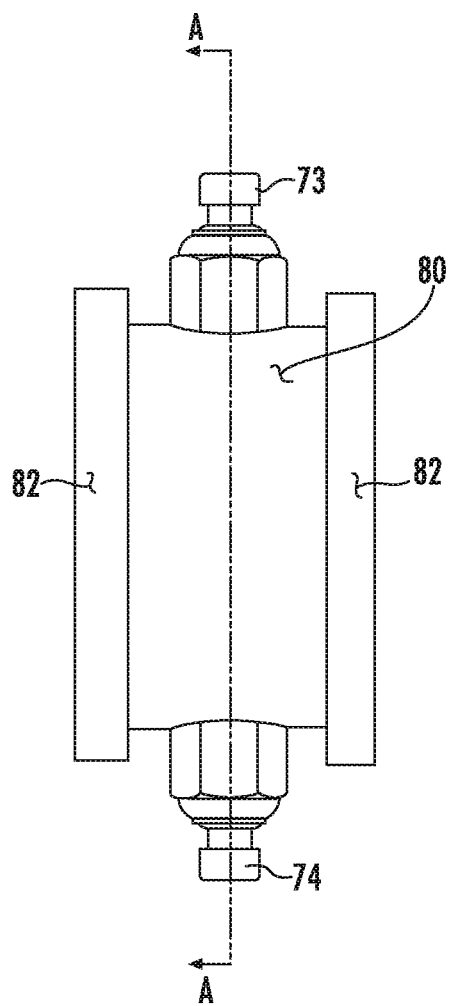
FIG. 10 is a side view of the scaling tool of FIG. 9 ("Compact" design) in an assembled condition.
Figure 11:
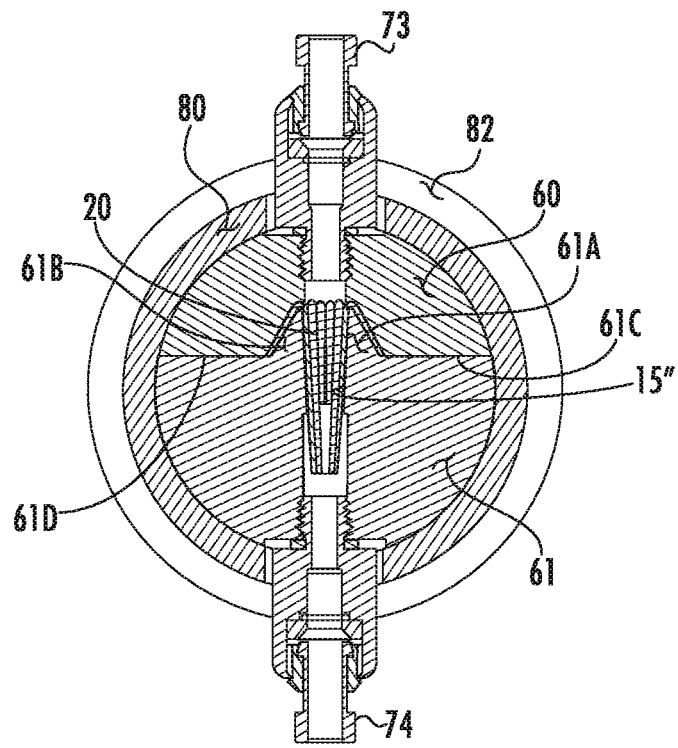
FIG. 11 is a cross-sectional view of the scaling tool of FIG. 9 ("Compact" design) taken along line A-A of FIG. 10.

FIGS. 9-11 illustrate another device (Compact design) into which the filter receiving region can be incorporated to provide a scaling tool that closely replicates the filtration performance of a large-scale device. In the embodiment shown, the filter receiving region 15" is formed by first and second compression members 60, 61. The first and second compression members 60, 61 are shaped to cooperate to form the filter receiving region 15". In some embodiments, the first compression member 60 is generally arcuate, and includes a trapezoidal cut-out region 70 along its axial length. One or more apertures 72 can be located in the first compression member 60 to provide fluid communication between a fluid inlet fitting 73 and the filter receiving region 15". In some embodiments, the second compression member 61 is also generally arcuate, and includes the filter receiving region 15" which is formed as an axially extending wedge-shaped cut-out. One or more apertures (not shown) can be located in the second compression member 61 to provide fluid communication between a fluid outlet fitting 74 (and/or vent) and the filter receiving region 15". In certain embodiments, the pleats of a pleated membrane 20 can be inserted into the filter receiving region 15", with the wings or ends 20A, 20B of the pleated membrane 20 folded over the triangular ear members 61A, 61B of the second compression member 61, and extending onto generally flat regions 61C, 61D of the second compression member 61. When the pleated membrane 20 is so positioned, the first compression member 60 can be aligned with the second compression member 61, sandwiching the ends 20A, 20B of the pleated membrane 20 between the first and second compression members 60, 61 and securing the pleated membrane 20 in the filter receiving region 15". In some embodiments, the assembly of the first and second compression members 60 and 61 with the pleated membrane contained in the filter receiving region 15" can be secured with a hollow cylindrical collar 80 that includes an internal bore 81 of sufficient internal diameter to tightly receive the assembly. Endcaps 82 or the like can be sealed in the collar 80. The collar 80 may include apertures 83A, 83B that align with the respective apertures in the first and second compression members to allow for fluid flow through the tool. Materials of construction for the scaling tool include those that do not deleteriously interfere with the fluids used during filtration, such as polypropylene, Nylon, polyethylene, polysulfone, polycarbonate and other thermoplastics or thermosetting polymers.

With the modification of the pleat height, angle and base width of the filter receiving region, the small scale device can scale to any specific pleat configuration large scale device. For example, in addition to scaling to high area products as demonstrated below, it is known that EMD Millipore's Durapore II (Polyvinylidene fluoride, PVDF), a high pleat density device, also has similar filtration scaling phenomena with flat sheet membrane device such as OS-25 in different streams such as Soy T and water. With modification, the present scaling tool design is also scale accurate to Durapore II which is also a high density pleat large scale device in streams that the OS-25 flat sheet membrane device cannot scale accurately.

Example 1. Theoretical Determination of Filter Receiving Region Configuration

Figure 21:
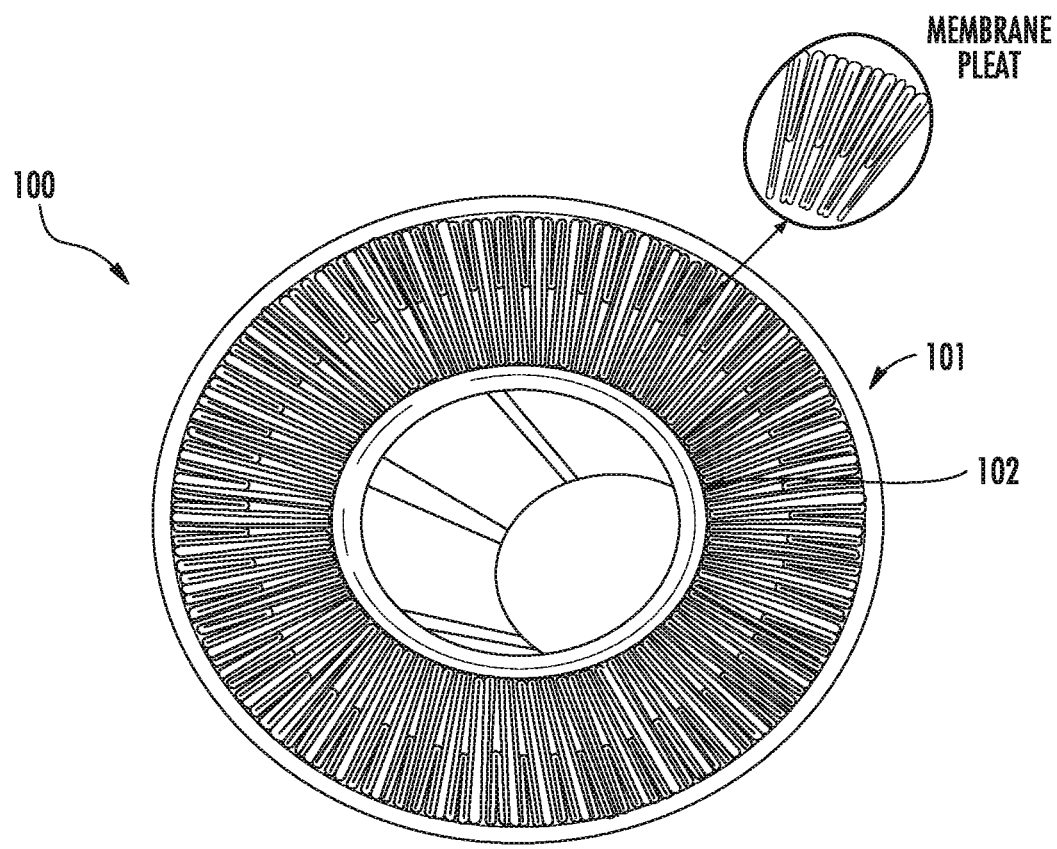
FIG. 21 is a perspective view of a EMD Millipore Express® High Area large-scale filtration device with M Pleat.

An exemplary conventional large-scale filtration device 100 is illustrated in FIG. 21. The inside diameter (ID) of the large scale device sleeve 101 is 2.62 inches. The outside diameter (OD) of the large scale device core 102 is 1.35 inches. There are a total of 159 membrane pleats in the large scale device 100. The full height of the pleat (standard pleat) is 0.63 inches. The shorter M-pattern pleats are 60% of the height of a standard pleat. The standard pleat to M pleat ratio is 2:1. There are a total of 52 short pleats (M pleat) and 107 standard pleats.

The scaling tool to be constructed will have 3 total pleats including 1 M-pattern pleat and 2 standard pleats. Based on this, the theoretic design for the filter receiving region is as follows:

The wall angle is 360°/159*3=6.8°.

The base length occupied by a pleat in the large-scale device is 2Πr/(pleat number), which is 1.35Π/159. Since there will be 3 total pleats in the scaling tool, the base length (B) of the scaling tool is 1.35Π/159*3=0.08 inches.

The height (H) of the filtration receiving region is 0.63 inches to match the full height of the pleat in the large scale device 100.

The width (L) of the filtration receiving region is chosen to be ½" to 1", depending on the scale down membrane area requirement. The objective is to minimize the membrane area in the scaling device, while also minimizing the scaling tool feed volume, yet still have sufficient membrane area and feed volume to generate accurate filtration performance data. Accordingly, this dimension of the filtration receiving region of the scaling tool can be modified by those skilled in the art to achieve a suitable effective membrane area based on the feed volume to be used.

The resulting theoretic design configuration is the baseline and will produce filtration performance that is proportional to the filtration performance (e.g., throughput) of the large scale device 100. In some embodiments, that proportion is one-to-one or substantially one-to-one. In other embodiments, that proportion is other than one-to-one, and a scaling factor can be applied to modify the design of the filter receiving region based on actual scaling tests.

In theory if the scaling tool provides proper water scaling, then the scaling tool should also accurately scale to challenge streams. This theory was tested after proper water scaling was achieved to ensure scalability for various process streams. While the different embodiments of the scaling tool each can represent different filter receiving region angles, in the case of scaling they approach unity for water permeability.

Example 2. Demonstration of Cutting and Insertion of Membrane to Angle of Filter Receiving Region A full 10" Millipore Express® High Area SHC device was removed from the outer sleeve and placed into an ultrasonic pack cutter. The pack cutter rotated the pleated membrane while ultrasonic blades cut the pack into a desired cross section. The cross section typically having a width of ½ to 1 inch was reduced further by manually cutting a single M pleat with wings that were used to secure the filtration area into place for the scaling tool. The pleated membrane was manually positioned into place, ensuring a centered and complete insertion.

This single M pleat was used throughout the scaling tool design along with the concept of a wedges angle for scaling purposes. The described filter receiving region, e.g., a wedge, was implemented into Puck, Cup and Compact designs as described earlier. Each design used a slightly different method of fixing the pleats within the rigid wall filter receiving region. It has been demonstrated that regardless of device design, the filter receiving region is the driver of filtration performance.

Example 3. Assembly of a Rigid Wedge in the Embodiment of FIG. 1 (Puck Design)

Before insertion into the scaling tool member of FIG. 1, the pleat wings were seamed at the edges to bond membrane layers together, followed by insertion into the filter receiving region 15 of the member 10. The bottom pleated membrane's wings were adhered to the member 10 via a silicone sealant. A plastic insert 28 was also adhered to the top of the wings to ensure a secure fit. A plastic collar 29 was placed around the outside of the member 10 for endcapping purposes. The top and bottom of the pleat was then sealed by a standard endcapping process using a customized fixture to hold the device in place. The ribs on the top and bottom of the member 10 functioned to aid in the bond strength and integrity of the endcaps.

Example 4. Assembly of a Rigid Wedge in the Embodiment of FIG. 6 (Cup Design)

With the pleated membrane inserted into the scaling tool 10' of FIG. 6, the membrane was centered and fully pushed into the filter receiving region 15". The pleats were affixed to the tool 10' via a two-part epoxy adhesive. The epoxy was first administered into a flat tip syringe. The syringe was dispensed into the voids located on either side of the pleated membrane from the bottom up until full. The wings were then sealed by dispensing a bead of epoxy along the ridge of the wedge. The tool connection was standard 1.5" TC connection for easier usage.

Example 5. Assembly of a Rigid Wedge in the Embodiment of FIG. 9 (Compact Design)

The embodiment of FIG. 9 device was composed of three parts: the core part being the filter receiving region in the second compression member 61; the first compression member 60 that services to clamp the wings of the pleated membrane 20 to prevent flow around the pleats; and the collar 80 that maintains compression between the first and second compression members 60, 61 and integrity of the device as a whole. The collar 80 also served as the inlet and outlet of the device.

One repeating unit of the M-pleat was taken from an Millipore Express® High Area SHC pleated cartridge as described in Example 1. The M-pleat was cut down to a length of one inch, to match the length of the filter receiving region 15". This pleat was placed between the first and second compression members 60, 61. Epoxy was applied to the wings to aid in sealing of the pleat wings.

When first and second compression members 60, 61 encapsulate the pleat, they were inserted into the collar 80. The doctoral blade technique was then used to apply an even and known thickness of epoxy onto a film. The device was then placed into the epoxy to seal/pot the edges of the pleats. The device was then set to cure.

Example 6. Challenging Stream Study

Figure 12:
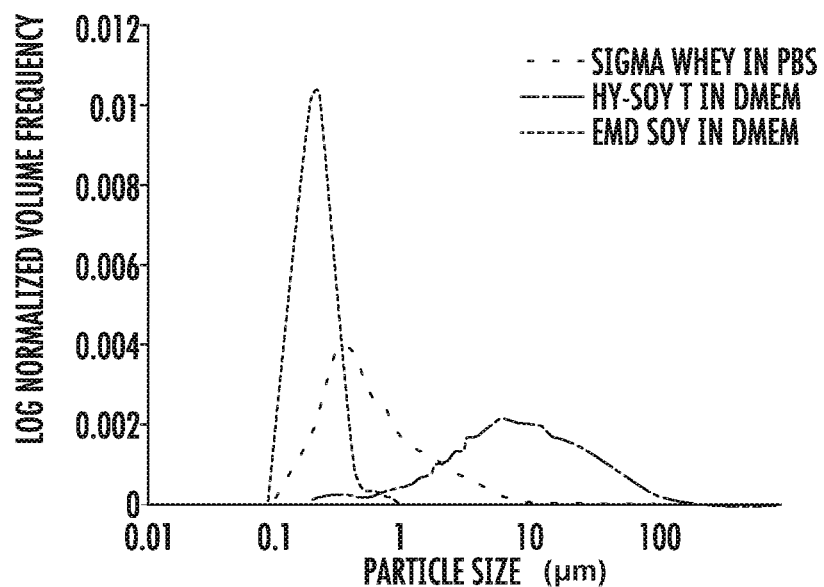
FIG. 12 is a graph showing particle size distributions of challenging streams used to demonstrate the scaling tools of embodiments disclosed herein.

The three challenge streams were used in this study; they are listed below in Table 1. These streams represented small, mid, and large particle sizes and particle size distribution. The particle size distributions of these streams are plotted in FIG. 12. The challenge streams were concentrated to achieve a high degree of plugging (>90% flux decay at <1000l/m2 of filtrate) within about 30 minutes at the process conditions.

TABLE 1

List of Challenge Streams for Throughput Testing

| Name | General Description | Stream Components |
|---|---|---|
| EMD Soy | Small particle size, narrow distribution | 2.0 g/L EMD Soy in DMEM with 3.7 g/L sodium bicarbonate and 1 g/L Pluronic ® F-68 surfactant |
| Sigma Whey | Mid particle size, mid distribution | 0.3 g/L Sigma Whey in PBS buffer |
| Soy T | Large particle size, wide distribution | 0.1 g/L soy T in DMEM with 3.7 g/L sodium bicarbonate and 1 g/L Pluronic ® F-68 surfactant |

The components thereof are disclosed in Application Note, "Performance of High-Area Millipore Express® Cartridge Filters", www.emdmillipore.com, May 2016, the disclosure of which is incorporated herein by reference in its entirety.

Test Method: OptiScale® 25 and 10" High Area Device

All of the scale up tests were performed with OptiScale® 25 capsules (3.5 cm$^2$ of EFA) tested simultaneously with the corresponding 10-inch cartridge containing membranes from the same lot. The cartridges were installed into Millipore Series 3000 single round in-line stainless steel housings (EMD Millipore, Billerica, Mass.) with 1.5-inch diameter inlet and outlet sanitary fittings. Five 25-mm samples obtained were tested for each 10-inch cartridge.

Reverse osmosis purified water was used for all the clean water permeability tests. Both the 25-mm discs and the 10-inch cartridges were first tested for clean water permeability at 69 kPad at about 21-25° C. in a dead end (normal flow) configuration. All permeability values were adjusted to 23° C.

Water flow rates for the 10-inch sub-assembly were measured using a Micro Motion F-series Coriolis flow meter. For the 25-mm discs, load cells (Tedea Huntleigh: Vishay Measurements Group, Malvern, Pa., 0.5 kg) were used to record the accumulation of permeated water with time. Water temperature was measured with an Anderson inline temperature transmitter and feed-to-permeate pressure differential was measured using (Cole Parmer, Vernon Hills, New Jersey) 0-344.7 kPad differential pressure transducers for both the 25-mm and 10-inch sub-assembly tests. All the instruments were connected to a data acquisition system which recorded data at 10 s intervals. The water permeability tests were run until an essentially steady-state flux condition was achieved, typically within 5 minutes.

Throughput tests involving plugging solutions were run at a constant pressure differential of 69±7 kPad, in dead end mode. The same instrumentation used to measure water flow rates filtrate volumes were used to measure challenge stream flow rates and filtrate volume for the 25-mm discs and the 10-inch cartridges. Feed-to-permeate pressure differential, temperature, and accumulated permeate mass with time data were collected using the data acquisition system. The tests were run until the membrane permeability was reduced by at least 95% compared to the clean water permeability. This level of plugging was typically achieved within about 30-45 minutes at the stated operating conditions.

Figure 13:
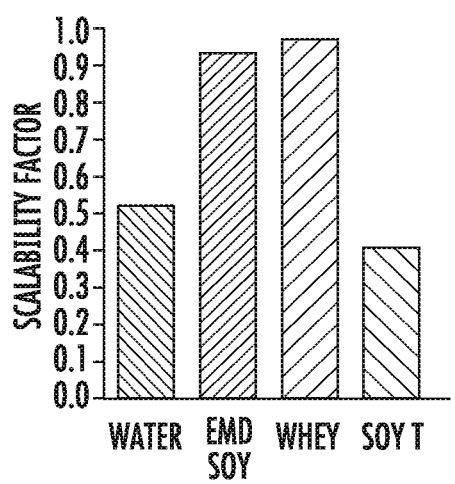
FIG. 13 is a graph showing throughput values of challenging streams.
Figure 15:
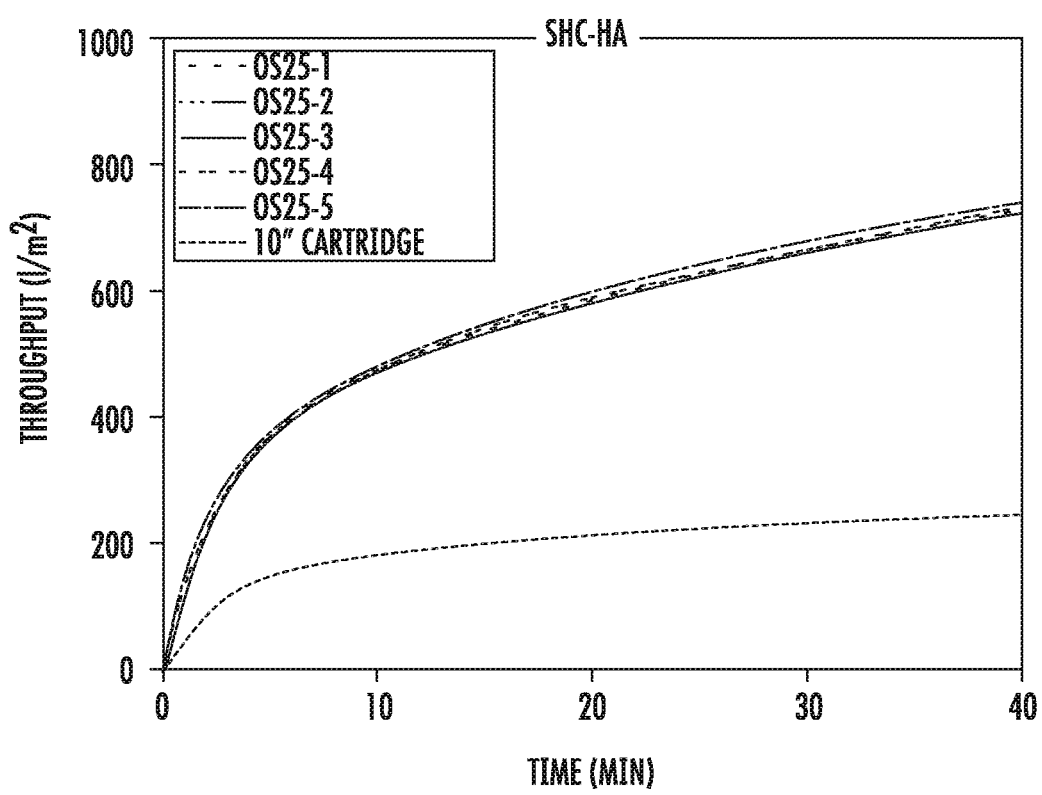
FIG. 15 is a graph showing throughput values of various devices.

Medium to high plugging streams that do not have a caking phenomenon achieve an OS-25 to device ratio of approximately one, while caking streams throughput values diverge between OS-25 capsules and high area devices. Results for each stream for SHC-HA can be seen in FIG. 13. This caking phenomenon creates divergent throughput results between OS-25 scaling capsules and high area devices. As seen in FIG. 15, the compression found in Millipore Express® High Area SHC gives lower than expected throughput values when compared to OS-25 capsules.

After permeability and throughput testing, the EFA of each 10" cartridge was verified by dismantling the cartridge, unfolding the pleat pack, and measuring the surface area available for filtration.

Water permeability data for each of the membrane and device types are summarized in Table 2.

TABLE 2

Cartridge to disc scaling factors for water permeability.

| Device Type | Water Permeability (LMH/psi) | | Flow Resistance (PSI/LMH) | | Scaling Factor |
|---|---|---|---|---|---|
| | OptiScale-25 | 10" Cartridge | Membrane | Support | |
| SHC-HA | 831 | 435 | 0.0012 | 0.0011 | 0.52 |

The water permeability scaling factor for SHC-HA is approximately 0.5 comparing with OS-25.

Test Method: OptiScale 25 and Scaling Tool

The large scale throughput data was then used for comparison purposes when testing scaling tool devices in-line with OS-25 capsules. A successful scaling tool should provide similar ratios to that of the water permeability and throughput values of the OS-25 versus the 10 inch high area device.

All tests were performed with OptiScale® 25 capsules (3.5 cm$^2$ of EFA) tested simultaneously on a manifold with scaling tools using membrane from the same lot. The scaling tools of the embodiment of FIG. 1 were installed into Millipore Series 3000 single round in-line stainless steel housings (EMD Millipore, Billerica, Mass.) with 1.5-inch diameter inlet and outlet sanitary fittings. The scaling tool of the embodiment of FIG. 6 utilized an 8 millimeter to 1.5-inch diameter adaptor with gasket and clamp to attach to the testing manifold. The scaling tool of the embodiment of FIG. 9 was self-contained, utilizing Luer locks to secure onto the manifold.

For the OS-25 discs and scaling tools, load cells (Sentray, Santa Ann, Calif.) were used to record the accumulation of permeated water with time. Water temperature was measured with an Anderson inline temperature transmitter and feed-to-permeate pressure differential was measured with an Anderson inline temperature and feed-to-permeate pressure differential was measured using 0-344.7 kpad differential pressure transducers for both the 25-mm and scaling tool tests. All the instruments were connected to a data acquisition system which recorded data at 10 s intervals. The water permeability tests were run until an essentially steady-state flux condition was achieved, typically within 10 minutes.

Throughput tests involving plugging solutions were run at a constant pressure differential of 10 psi, in dead end mode. The same instrumentation used to measure water flow rates filtrate volumes were used to measure challenge stream flow rates and filtrate volume for the 25-mm discs and the scaling tool devices. Feed-to-permeate pressure differential, temperature, and accumulated permeate mass with time data were collected using the data acquisition system. The tests were run until the membrane permeability was reduced by at least 95% compared to the clean water permeability. This level of plugging was typically achieved within about 30-45 minutes at the stated operating conditions.

Figure 16:
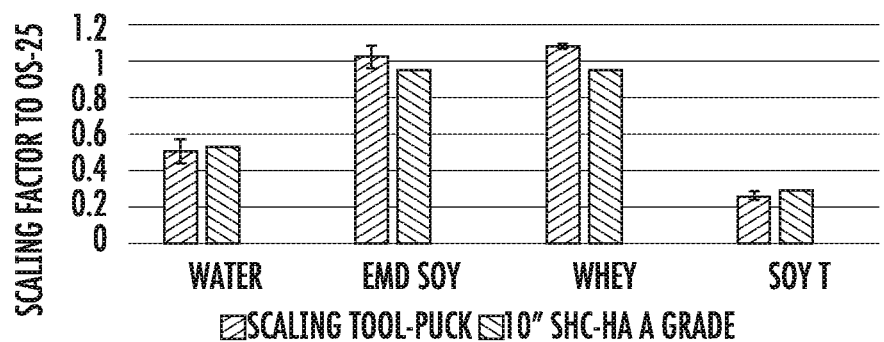
FIG. 16 is a graph comparing water permeability/through scaling factors of a 10" large-scale device and a scaling tool device ("Puck" design) in accordance with certain embodiments.
Figure 17:
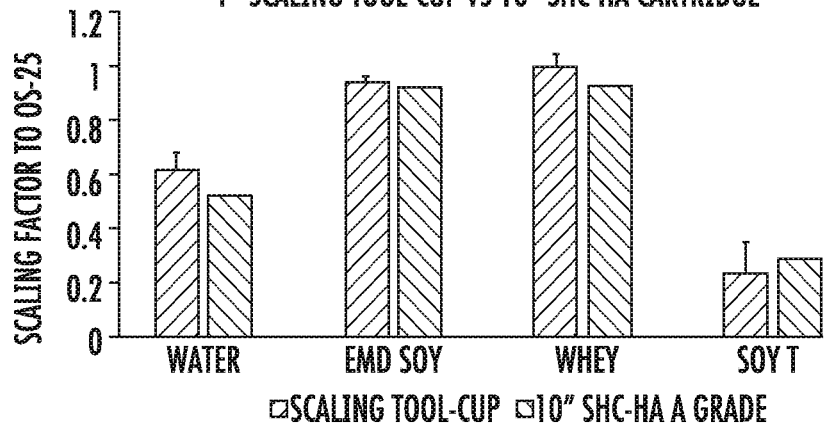
FIG. 17 is a graph comparing water permeability/through scaling factors of a 10" large-scale device and a scaling tool device ("Cup" design) in accordance with certain embodiments.

Both the scaling tool of the embodiment of FIG. 1 and of FIG. 6 were able to accurately scale in water permeability and the throughput of three different media streams as show in FIG. 16 and FIG. 17.

Test Method: Scaling Tool and 10" Device

Given the water permeability and throughput data comparing the OS-25 to 10 inch high area cartridge and correlating their ratios to that of the OS-25 and scaling tool should give a clear indication of proper scaling of the scaling tools to the 10 inch high area devices. Due to already scheduled application work for the 10 inch high area devices using the aforementioned challenged streams, this provided an opportunity to directly compare the scaling tools to a full 10 inch cartridge. For our testing the embodiment of FIG. 6 was selected using membrane from the same lot as the tested 10 inch cartridge.

The test method for this experiment was performed using the same set up as described above in "Test Method: OptiScale 25 and 10" High Area Device," with two scaling tools of the embodiment of FIG. 6 placed in the same manifold as OS-25 capsules.

One of the three challenge stream had been tested with all three devices in use. The tables below represents all three devices (10 inch cartridge, OS-25, and scaling tool) using SHC membrane from the same lot from EMD Soy throughput testing (as seen in Table 3).

TABLE 3

| | EMD Soy Scaling (2 g/L): SHC | | | | | | |
|---|---|---|---|---|---|---|---|
| Sheet Name | OS25 Avg | OS25 Stdev | SHC-1023-Cup1 | SHC-1023-Cup2 | Cup Avg | Cup Stdev | SHC-1015-Cartridge |
| Batch Time, tB (hours) | | | 0.67 | 0.67 | | | 0.67 |
| Flux Decay (%) at 40 minutes | 95 | 1 | 83 | 84 | 84 | 1 | 85 |
| Meas. Wat/buf Perm. @ 23 C. (LMH/psi) | 878 | 54 | 517 | 561 | 539 | 32 | 518 |
| Final Loading w/Safety Factor (L/m2) | 1427 | 45 | 1384 | 1477 | 1431 | 66 | 1418 |

The above raw data for Optiscale® 25, the embodiment of FIG. 6, and the large scale high area device were then compared to determine scaling accuracy. As seen in previous sections, scaling between the 10 inch high area cartridge and OS-25 devices per unit area was approximately half in water. Comparing the cartridge to the scaling tool of FIG. 6 shows water permeability values within 5%. Since EMD Soy is a non-caking stream OS-25 scaled properly to a full SHC cartridge in this case at 99% accuracy. Comparison of the scaling tool of FIG. 6 to a full SHC cartridge also shows scaling within 99% accuracy. These data point to the scaling tool of FIG. 6 as providing superior scaling properties to that of the OS-25 in high area applications due to linear scalability in both water permeability and EMD Soy throughput testing (as seen in Table 4).

TABLE 4

| Scaling Factors of EMD Soy Scaling (2 g/L): SHC | | |
|---|---|---|
| | Water Perm. Scaling Factor | Throughput Scaling Factor (@ end point) |
| Cartridge: OS25 | 0.59 | 0.99 |
| Cartridge: FIG. 6 embodiment | 0.96 | 0.99 |

Figure 18:
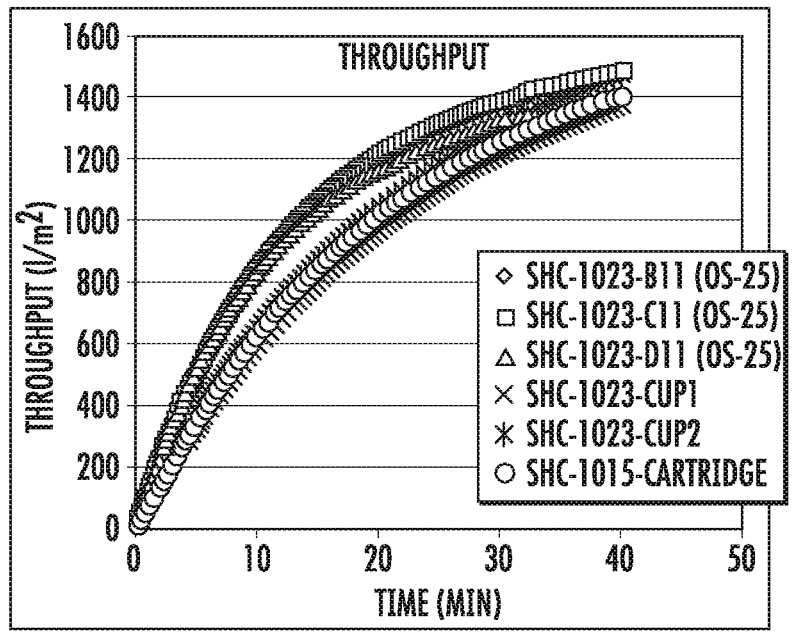
FIG. 18 is a graph showing throughput values of various devices.
Figure 19:
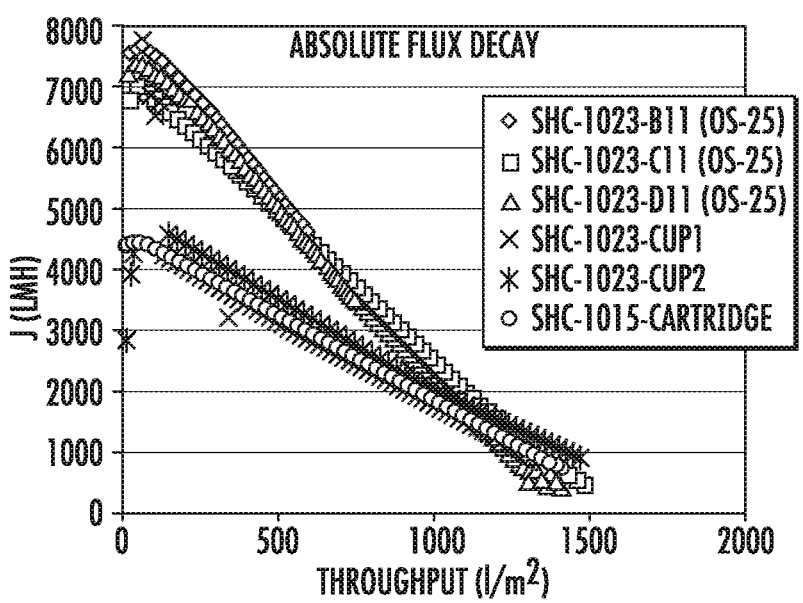
FIG. 19 is a graph showing throughput values of various devices.

An alternative depiction of the throughput values of the OS-25, scaling tool and 10-inch high area device is found in FIGS. 18 and 19. From FIG. 18 the graph illustrates throughput vs time of each device, with the scaling tool and cartridges following near identical throughput trends throughout the experiment, while the OS-25 diverges from the cartridge, but achieving unity at the end of the run. FIG. 19 shows the trends of the absolute flux decay from time zero to the end of the run, once again depicting the linear scaling of the scaling tool to cartridge compared to the irregularities in the OS-25 versus cartridge absolute flux decay.

While various aspects and embodiments have been disclosed herein, other aspects, embodiments, modifications and alterations will be apparent to those skilled in the art upon reading and understanding the preceding detailed description. The various aspects and embodiments disclosed herein are for purposes of illustration and are not intended to be limiting. It is intended that the present disclosure be construed as including all such aspects, embodiments, modifications and alterations insofar as they come within the scope of the appended claims or the equivalents thereof.

What is claimed is:

1. A cup-style scaling tool for replicating filtration characteristics of a large-scale filtration device, comprising:
    a disc-shaped housing having a circular surface, wherein the circular surface includes a rectangular, wedge-shaped slot adapted to be a filter receiving region and cut-outs adjacent the wedge-shaped slot, the disc-shaped housing having a cup-shape and an annular groove capable of receiving a seal,
    wherein the filter receiving region has a fluid outlet and extends axially from the circular surface, and comprises a rigid wall framework configured to hold and compress one or more pleats of a membrane and compress said one or more pleats in an amount effective to proportionally replicate the filtration performance of said large-scale filtration device; and
    a wedge-shaped pleated membrane having one or more pleats and comprising ends capable of being placed in the cut-outs, and
    a cover having one or more fluid inlets in fluid communication with said fluid outlet of said filter receiving region, said cover and said disc-shaped housing being sealed together.

2. The scaling tool of claim 1, wherein said pleats of said pleated membrane are oriented in an M-pleat pattern.

3. The scaling tool of claim 1, wherein said proportional replication is a 1:1 replication of throughput.

* * * * *